United States Patent [19]

Weidler

[11] Patent Number: 4,649,977
[45] Date of Patent: Mar. 17, 1987

[54] TIRE CHAIN

[75] Inventor: Erhard A. Weidler, Aalen-Unterkochen, Fed. Rep. of Germany

[73] Assignee: RUD-Kettenfabrik Rieger & Dietz GmbH u. Co., Aalen, Fed. Rep. of Germany

[21] Appl. No.: 711,309

[22] Filed: Mar. 13, 1985

[30] Foreign Application Priority Data

Mar. 16, 1984 [DE] Fed. Rep. of Germany ....... 3410220

[51] Int. Cl.$^4$ .............................................. B60C 27/00
[52] U.S. Cl. ...................................... 152/243; 59/78; 59/84; 152/171; 228/192
[58] Field of Search ............... 152/243, 171, 172, 232, 152/239, 240, 231, 217, 218, 219; 59/93, 78, 84; 245/4; 294/77; 228/192; 219/51, 52; 148/39, 145

[56] References Cited

U.S. PATENT DOCUMENTS

| | | | |
|---|---|---|---|
| 3,124,929 | 3/1964 | Kito et al. | 148/39 X |
| 3,958,825 | 5/1976 | Diamond | 59/93 X |
| 4,106,542 | 8/1978 | Dohmeier | 192/243 X |
| 4,147,023 | 4/1979 | Weidler | 59/93 X |

Primary Examiner—Donald Czaja
Assistant Examiner—Thomas Bokan
Attorney, Agent, or Firm—Mark P. Stone; F. Eugene Davis, IV

[57] ABSTRACT

In a tire chain, at least one junction point has a horizontal link having the form of a shackle with a main part and with outward-directed ends adjoining this. The hardness of the main part is greater than the hardness of the ends facing one another, these being joined to one another by means of a connecting part which is mushroom-shaped. The connecting part in turn has a hardened head and a hardened foot which are connected to one another via a soft shank.

17 Claims, 12 Drawing Figures

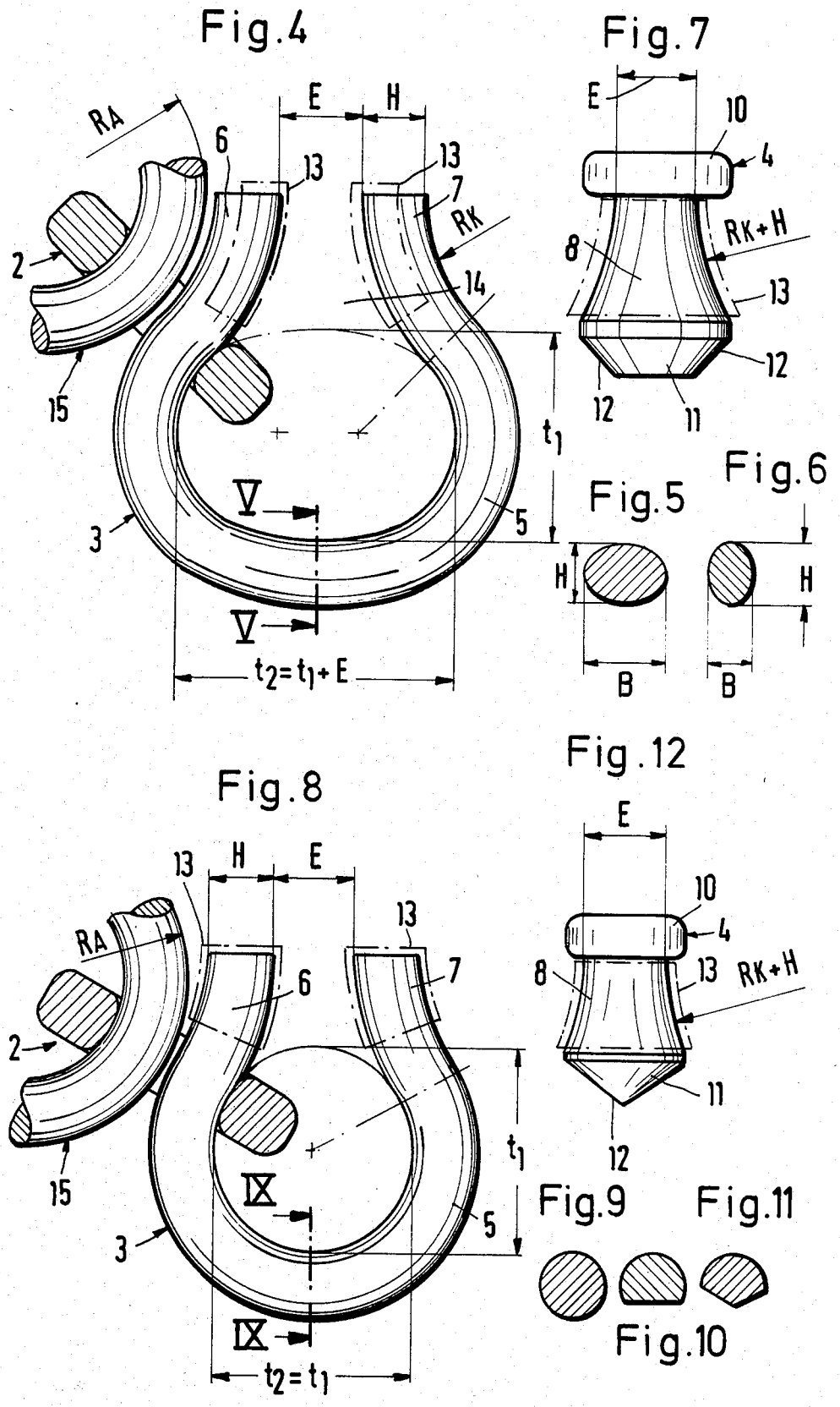

TIRE CHAIN

BACKGROUND OF THE INVENTION

The invention relates to a tire chain with junction points, each formed by at least three vertical links standing upright, that is to say oriented perpendicularly to the tire surface, and by one horizontal link lying flat, that is to say oriented parallel to the tire surface, the horizontal link of at least one junction point having the form of a shackle with an essentially annular main part and with two outward-directed ends arranged at a distance from one another and bridged by a connection part.

A chain netting for a tire chain of the above type is known from German Offenlegungsschrift No. 2,658,009 corresponding to U.S. Pat. No. 4,147,023. In the known chain netting, at least one junction point has a horizontal link which is designed as a chain joint and in the annular main part of which the vertical links can be inserted through an insertion slot subsequently closed by means of a screw bolt which connects to one another the outward-directed ends of a shackle also forming the main part, these ends having aligned bores for receiving the screw bolt. The advantage of a junction point of the above type is that, before assembly, its horizontal link can be subjected to heat treatment resulting in a sufficiently high surface hardness. There is no need to spread open the shackle or subsequently press it shut respectively before and after the vertical links have been hooked in, particularly because the position of the ends of the shackle does not need to be changed during or after the links have been joined together. However, the advantage described entails the disadvantage that it is not possible with sufficient reliability to prevent the connecting element from loosening under unfavourable loads. In addition, the production outlay for the chain joint described is comparatively high.

The danger of unintentional opening, inherent in a chain joint, disappears when the horizontal link of a junction point is closed by means of welding after the vertical links have been hooked in. Tire chains having junction points formed in a corresponding way are sufficiently known. In these, the end faces of a bent structural-bar section forming the horizontal link of a particular junction point are joined directly to one another by means of resistance butt welding. However, as already mentioned above, such a design of a junction point prevents the possibility of heat treatment resulting in a sufficiently high surface hardness of the horizontal link, before the links are assembled, since, in order to hang the vertical links in the horizontal link, it is necessary to spread open the horizontal link beforehand and/or bend it together subsequently, and at the same time a surface-hardened shackle is particularly inclined to form hairline cracks. In practice therefore, in such cases joint heat treatment of all the links is also carried out after the particular horizontal link has been welded shut. However, even this entails disadvantages in that, on the one hand, the choice of different materials for the horizontal and vertical links is limited and, on the other hand, the technical devices for the heat treatment of a chain netting are more expensive than those for the heat treatment of individual chain links. Because of the above-indicated difficulties of welded constructions, they have not found general acceptance despite the advantage that there is no fear that their junction points will loosen unintentionally.

SUMMARY OF THE INVENTION

The object on which the invention is based is to provide a tire chain of the type defined in the introduction, which has at least one junction point, the horizontal link of which on the one hand can undergo heat treatment resulting in a high surface hardness before the junction point is formed, and on the other hand, whilst being easy to produce, guarantees the desired reliability that the junction point will not fall apart.

In a tire chain of the type under consideration, this object is achieved, according to the invention, because the hardness of the main part of the shackle is greater than the hardness of at least the sides of its ends facing the connecting part, and because the connecting part is made mushroom-shaped and is joined along its shank to the ends of the shackle by means of welding seams.

The advantage of the tire chain according to the invention is that its junction point designed in the way mentioned above can be made by simple means, has great strength, cannot open and allows a high measure of freedom as regards heat treatment. The outward-directed ends of the shackle make it possible without difficulty to carry out different heat treatments on the main part of the shackle and the shackle ends. Whereas the surface hardness of the main part can be high to achieve a high wearing resistance, the shackle ends remain comparatively soft, so as not to impair the welding operation. Because of the use of a mushroom-shaped connecting part, that is to say a part having a head projecting beyond the shank, protection against wear is obtained both for the ends of the shackle and for the welding seams. Furthermore, the mushroom-shape design of the connecting part makes it possible or makes it easier to produce long firm welding seams.

BRIEF DESCRIPTION OF THE DRAWINGS

Further features and details of the invention emerge from the sub-claims and from the following description of two junction points of a tire chain which are illustrated in the attached drawing in which;

FIG. 4 shows details of the shackle of the junction point;

FIG. 5 shows a section along the line V—V in FIG. 4;

FIG. 6 shows a cross-section, corresponding to FIG. 5, of a modified shackle;

FIG. 7 shows a connecting part for the ends of the shackle;

FIG. 8 shows a detail of a further junction point;

FIG. 9 shows a section along the line IX—IX in FIG. 8;

FIG. 10 shows a modified shackle cross-section;

FIG. 11 shows a further modified shackle cross-section, and

FIG. 12 shows a connecting part for the shackle according to FIG. 8.

DESCRIPTION OF THE BEST MODES

Figure 1:
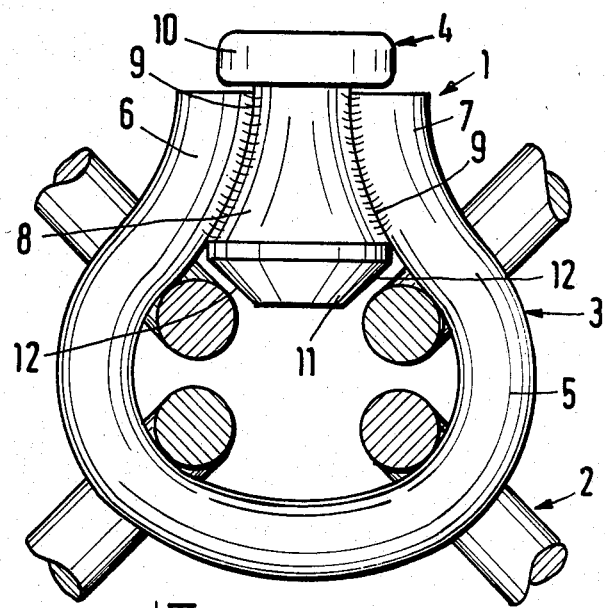
FIG. 1 shows a plan view of the first junction point.

FIG. 1 illustrates the junction point of a tire chain which has a horizontal link, designated as a whole by 1, and four vertical links designated as a whole by 2. The horizontal link 1 is formed by a shackle 3 and a connecting part 4. The shackle 3 has an elliptical main part 5 and two ends 6 and 7 arranged at a distance from one another. The sides of the ends 6 and 7 facing one another are joined to a shank 8 of the connecting part 4 by means of four welding seams 9. The head 10 and the foot 11 of the connecting part 4 have the same diameter and project beyond the ends 6 and 7, as seen perpendicularly to the drawing plane. Because of the truncatedly conical design of the foot 11, stop surfaces 12 for the vertical links 2 hooked into the horizontal link 1 are obtained. As a result of the special form of the shank 8 of the connecting part 4, that is to say its cross-section increasing continuously from the head 10 to the foot 11, favourable stress conditions are obtained in the region of the welding seams 9 which join the connecting part 4 to the shackle 3.

Figure 2:
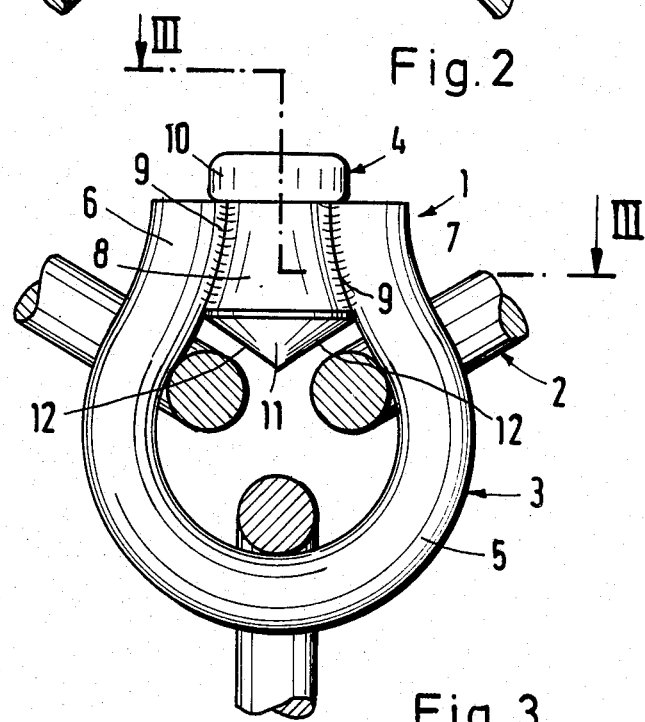
FIG. 2 shows a plan view of the second junction point.
Figure 3:
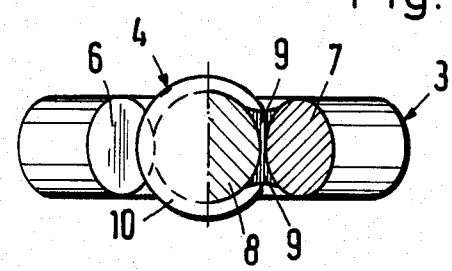
FIG. 3 shows a section along the line III—III in FIG. 2.

FIGS. 2 and 3 illustrate a junction point of similar design. The same reference symbols are used for parts corresponding to the parts of the junction point of FIG. 1. The differences from the junction point described first are that, in this case, the main part 5 is circular and only three vertical links are hooked into the shackle 3. Furthermore, the foot 11 of the connecting part 4 is not truncatedly conical, but tapered.

FIG. 3 shows that the head 10 of the connecting part 4 projects beyond the shackle 3 at the top and bottom and in this way protects the ends 6 and 7 and the welding seams 9 against the effects of wear. The favourable form of the welding seams can also be seen clearly, and this results from the cross-sectional form selected for the shank 8 and the ends 6 and 7 of the shackle 3.

FIGS. 4, 5 and 7 show parts of a junction point, corresponding to the junction point according to FIG. 1, before closure. In FIGS. 4 and 7, zones 13 of low surface hardness are marked by dot-and-dash lines. Outside the soft zones indicated by the dot-and-dash lines, the parts illustrated are hardened to increase their wearing resistance against external influences and against joint wear.

A comparison of FIGS. 4 and 7 shows that the contour of the shank 8 of the connecting part 4 matches the contour of the sides of the ends 6 and 7 of the shackle 3 which face it. In other words, the smallest diameter of the shank 8 corresponds to the width E of the insertion slot 14 at its narrowest point. The connecting part 4 is preferably designed as a lathe-turned article. The shank 8 has a radius of curvature equal to $R_K + H$, $R_K$ being the outer radius of curvature of the ends 6 and 7 and H being the height of the cross-section of the shackle 3, as indicated in FIG. 5 in which the width of the cross-section is denoted by B. The radius of curvature $R_K$ itself is essentially equal to the outer radius $R_A$ of horizontal links 15 connected to the particular junction point. The largest pitch $t_2$ of the shackle 3 should be at most equal to the smallest pitch $t_1 + E$.

FIG. 6 shows a modified cross-section of a shackle 3.

The same applies essentially to FIGS. 8, 9 and 12 as to FIGS. 4, 5 and 7, so that to avoid repetition reference can be made to what has already been said above. It should also be noted in addition that, in the two exemplary embodiments illustrated, the head 10 of the connecting part 4 in each case has the same outside diameter as the foot 11 of the connecting part.

Finally, FIGS. 10 and 11 show modified cross-sectional forms of a shackle 3.

In practice, the shackles 3 have a hardness of more than 700 HV in the region of their main parts. The same applies accordingly to the heads and feet of the connecting parts. In contrast to this, the strength of the shank of the connecting parts corresponds to the strength of hardened and tempered steels.

I claim:

1. Tire chain with junction points, each formed by at least three vertical links standing upright such that they are oriented perpendicularly to a tire surface, and by one horizontal link lying flat such that it is oriented parallel to the tire surface, the horizontal link of at least one junction point having the form of a shackle with an essentially annular main part and with two outward-directed ends arranged at a distance from one another and bridged by a connecting part including a shank, said two outward-directed ends each having an inner side facing said shank and an outer side facing away from said shank, the hardness of the main part (5) of the shackle (3) being greater than the hardness of at least the inner sides of its ends (6,7) facing the connecting part (4), said connecting part (4) being formed in a mushroom-shape and being joined along said shank (8) to the inner sides of the ends (6,7) of the shackle (3) by means of welding seams (9) to form said welding seams substantially protected from wear.

2. Tire chain as claimed in claim 1, wherein the head (10) and the foot (11) of the connecting part (4) have a greater hardness than its shank (8).

3. Tire chain as claimed in claim 2, wherein the contour of the shank (8) of the connecting part (4) matches the contour of the sides of the ends (6, 7) of the shackle (3) which face it.

4. Tire chain as claimed in claim 1, wherein the connecting part (4) is made rotationally symmetrical and is joined to the ends (6, 7) of the shackle (3) by means of V-shaped welding seams (9).

5. Tire chain as claimed in claim 4, wherein the connecting part (4) is designed as a lathe-turned article.

6. Tire chain as claimed in claim 1, wherein the shackle (3) is bent from a structural-steel section.

7. Tire chain as claimed in claim 6, wherein the main part (5) of the shackle (3) is circular.

8. Tire chain as claimed in claim 6, wherein the main part (5) of the shackle (3) is elliptical.

9. Tire chain as claimed in claim 8, wherein the larger pitch ($t_2$) of the shackle (3) is larger by at most an amount equal to the shortest distance (E) between the ends (6, 7) of the shackle (3).

10. Tire chain as claimed in claim 1, wherein the ends (6, 7) of the shackle (3) are curved, the radius of curvature ($R_K$) being approximately equal to the outer radius ($R_A$) of adjacent horizontal links (15).

11. Tire chain as claimed in claim 1, wherein the main part (5) of the shackle (3) has a hardness of more than 700 HV.

12. Tire chain as claimed in claim 2, wherein the head (10) and the foot (11) of the connecting part (4) have diameters which are greater than the height (H) of the cross-section of the ends (6, 7) of the shackle (3).

13. Tire chain as claimed in claim 12, wherein the diameters of the head (10) and of the foot (11) of the connecting part (4) are equal.

14. Tire chain as claimed in claim 2, wherein the foot (11) of the connecting part (4) is provided with stop surfaces (12) for vertical links (2).

15. Tire chain as claimed in claim 4, wherein the cross-section of the shank (8) of the connecting part (4) increases from the head (10) to the foot (11).

16. Tire chain as claimed in claim 1, wherein at least all the junction points of its tread netting are formed by horizontal links (1) having the form of a shackle (3), the ends (6, 7) of which are joined to one another by means of a welded-in mushroom-shaped connecting part (4).

17. Tire chain as claimed in claim 4, wherein at least all the junction points of its tread netting are formed by horizontal links (1) having the form of a shackle (3), the ends (6, 7) of which are joined to one another by means of a welded-in mushroom-shaped connecting part (4).

* * * * *